INVENTOR.
JERRY C. KOCI AND
BY STANFORD M. HEIDE
Whreedy & Whreedy
THEIR ATTORNEYS.

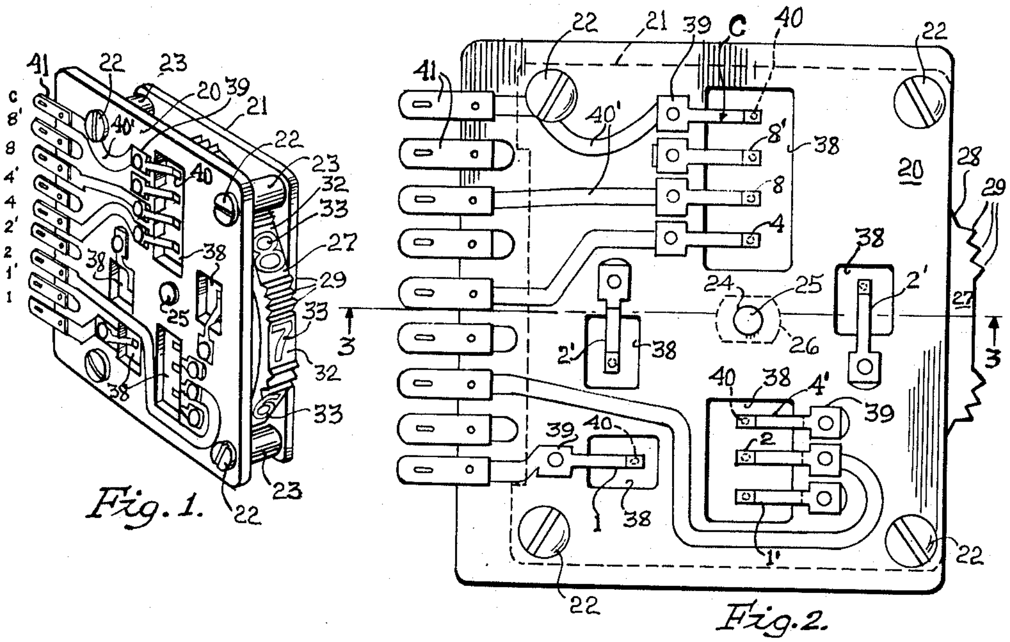
Fig. 1. Fig. 2.
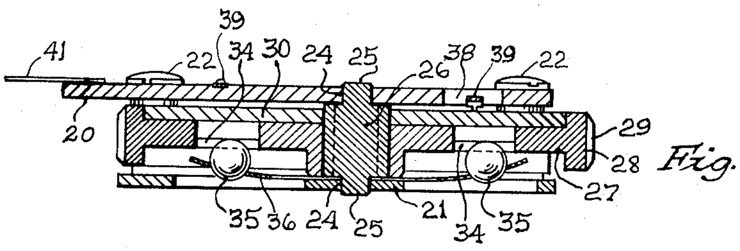
Fig. 3.
| DIGIT | BINARY | | | | COMPLEMENT | | | |
|---|---|---|---|---|---|---|---|---|
| | 8 | 4 | 2 | 1 | 1' | 2' | 4' | 8' |
| 0 | – | – | – | – | X | X | X | X |
| 1 | – | – | – | X | – | X | X | X |
| 2 | – | – | X | – | X | – | X | X |
| 3 | – | – | X | X | – | – | X | X |
| 4 | – | X | – | – | X | X | – | X |
| 5 | – | X | – | X | – | X | – | X |
| 6 | – | X | X | – | X | – | – | X |
| 7 | – | X | X | X | – | – | – | X |
| 8 | X | – | – | – | X | X | X | – |
| 9 | X | – | – | X | – | X | X | – |
Fig. 4.
INVENTORS.
JERRY C. KOCI AND
BY STANFORD M. HEIDE
Threedy & Threedy
THEIR ATTORNEYS.

United States Patent Office 3,010,101

Patented Nov. 21, 1961

3,010,101

DEVICE FOR VISUALLY DIGITALLY READING TO A BINARY CODE AND ITS COMPLEMENT

Jerry C. Koci, Barrington, Ill., and Stanford M. Heide, Kenosha, Wis., assignors to Chicago Dynamic Industries, Inc., Chicago, Ill., a corporation of Illinois Filed Feb. 24, 1960, Ser. No. 10,720

2 Claims. ((Cl. 340—347)

This invention relates to a device for visually digitally reading to a binary code and its complement. To this end the invention has for its object the provision of such a device which is relatively simple, inexpensive in manufacture and which is an improvement over prior art devices.

More specifically a principal object of the invention is to establish a plurality of circuits in different combinations between binary and its complement.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of the invention;

FIG. 2 is a side elevational view of the same;

FIG. 3 is a sectional view taken substantially on line 3—3 of FIG. 2;

FIG. 4 is a binary and its complement table;

Figure 5:
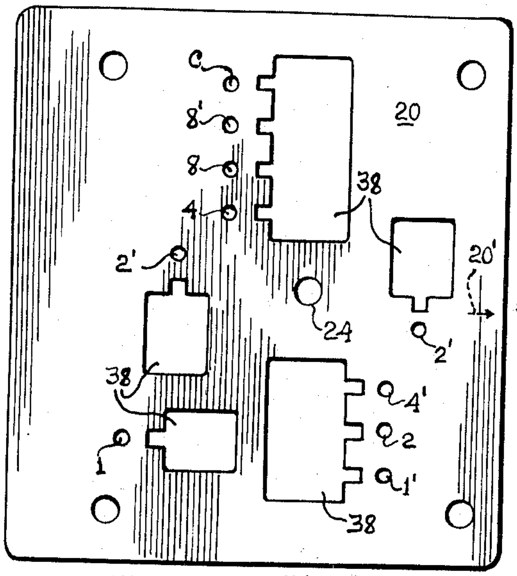
FIG. 5 is an elevational view of the face plate.
Figure 6:
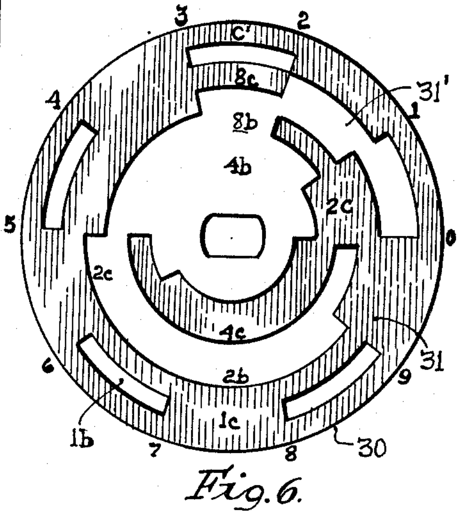
FIG. 6 is a plan view of a disc having a printed circuit on the face thereof.

The several objects of this invention are accomplished by the preferred form of construction shown in the accompanying drawings.

In this connection, a face plate is indicated at 20. The face plate 20 is connected to a complementary face plate 21 by means of suitable bolts 22 and is spaced therefrom by sleeves 23 carried by the bolts 22. The plates 20 and 21 are provided with aligned openings 24 which receive trunnions 25 formed as an integral part of a hub 26. Mounted on this hub 26 is a thumb wheel 27 having on its peripheral edge 28 spaced apart knurls 29 to facilitate rotating the wheel 27 relative to the plates 20 and 21. Carried by the wheel 27 on one side thereof is a disc 30 preferably formed of non-conductive material and having printed on the outer face thereof a printed circuit 31 of a predetermined pattern. The disc 30 is rotatable with the wheel 27.

Formed on the peripheral edge of the wheel 27 are flats 32, there being ten of such flats. On such flats there are arranged in any suitable manner digits 33 from 0 to 9, as best seen in FIG. 1.

In the wheel 27 in opposite radial alignment with the digits are tapered openings 34; adapted to engage in these openings 34 are detents 35 which are yieldably held in such engagement by a spring plate 36, the plate 36 having openings 37 formed therein of a smaller diameter than the diameter of the detents so as to have yieldable bearing upon the detents.

Formed in the plate 20 at predetermined positions are openings 38 exposing the surface of the disc 30 adjacent the wheel 27. Fixed to the plate 20 are conductor fingers 39 each of which is provided with a contact head 40 engaging the adjacent surface of the disc 31. Connected to these contact fingers 39 are conductors 40′, the corresponding ends of which terminate into terminal fingers 41 to which conductor or circuit wires are connected.

As before stated, the printed circuit is of a predetermined pattern so designed as to produce the various combination binary and their complement circuits as dilineated in the table shown in FIG. 4, which chart will now be described.

The digits which appear on the wheel 27 are shown in the left-hand column of the table. The numerals which appear beneath the word "binary" identify the binary contact fingers, which fingers, as shown in FIG. 2, for clarity will likewise be marked by like numerals. The contact C is the output contact, it being always in contact with the printed circuit 31. The "X" shown on the table (FIG. 4) indicates a closed circuit and the dash indicates an open circuit.

Figure 7:
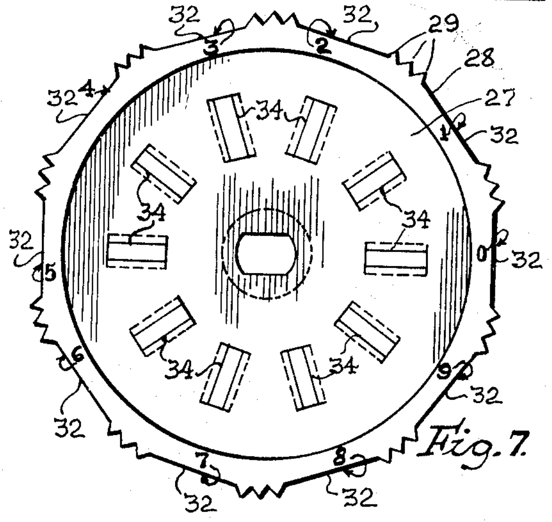
FIG. 7 is a plan view of a thumb wheel embodied in the invention.
Figure 9:
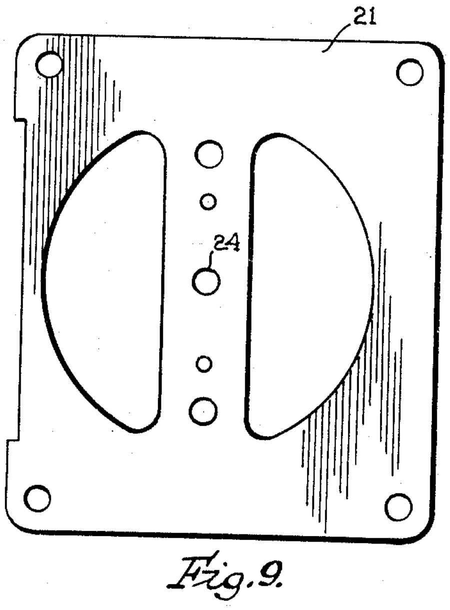
FIG. 9 is a plan view of a face plate embodied in the invention.
Figure 8:
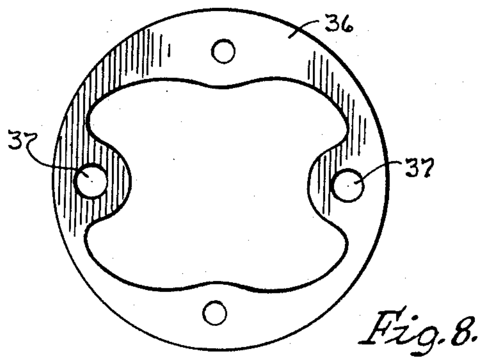
FIG. 8 is a plan view of a detent disc embodied in the invention.

The following two examples will illustrate the operation of the device. One familiar with the code can ascertain the relationship of a number to the binary code circuit and its complement. Normally the thumb wheel 27 is located in zero position as shown in FIG. 7. In such position the contact C is on the printed circuit at the point C′. Contacts 1, 2, 4 and 8 on the binary side are on the non-conductive areas 31′ of the disc 30, which specific areas are indicated at 1*b*, 2*b*, 4*b*, and 8*b*. On the complementary side, contacts 1′, 2′, 4′ and 8′ are on the conductive circuit at points substantially indicated at 1′*c*, 2′*c*, 4′*c*, and 8′*c*.

Rotation of the thumb wheel 27 with the arrow 20′ (FIG. 5) registering with the digit –1–, the following results: From a reading of the coded digit –1–, the coded binary and its complement will be ascertained and the binary contacts 8, 4 and 2 will be on the non-conductive areas. Binary contact 1 will be on the conductive or printed circuit area, whereas the complement contact 1′ will be on the non-conductive area of the disc 30 and complement contacts 2′, 4′ and 8′ will be on the conductive or printed area of the printed circuit of the disc 30.

By this simple arrangement one having the binary code 0–9, by rotating the thumb wheel 27 to register the code digit with the arrow 20′ (FIG. 5), there will be established the binary and its complement circuit corresponding to the code digit in registration with such arrow.

Our invention is particularly useful in establishing a coded binary circuit and its complement for sensing devices, signal devices, and many other devices or instruments under control by such circuits.

By such a device different combinations of binary circuits and their complements may be quickly and readily established through the use of code digits.

While we have illustrated and described the preferred form of construction for carrying our invention into effect, this is capable of variation and modification without departing from the spirit of the invention. We therefore do not wish to be limited to the precise details of construction set forth, but desire to avail ourselves of such variations and modifications as come within the scope of the appended claims.

Having thus described our invention, what we claim as new and desire to protect by Letters Patent is:

1. A device for visually digitally reading to a binary code and its complement comprising a pair of confronting spaced apart plates, a shaft carried by said plates and extending transversely therebetween, one of said plates having a plurality of openings formed therein, a wheel mounted on said shaft between said plates and having a peripheral edge portion extending beyond adjacent edges of said plate and engageable by the finger of a hand for imparting rotation to the wheel, a disc mounted on one side of said wheel in confronting relation with the plate in which said openings are formed and having its outer surface divided into conductive and non-conductive areas in a predetermined pattern, contact fingers carried by said one plate with end portions projecting through said openings into contact with said surface of said wheel to establish a plurality of binary and their complementary circuits in different combinations depending upon the relative position between said fingers and said surface of said disc, terminals carried at one edge portion of said one plate and connected to said fingers, and means for releasably holding said wheel in a predetermined position with respect to said plates.

2. The device defined in claim 1 characterized by the inclusion of spaced flats on the peripheral edge of the wheel with each flat having an identifying number thereon, and knurled portions between each of said flats.

References Cited in the file of this patent

UNITED STATES PATENTS

| | | |
|---|---|---|
| 2,700,076 | Goode | Jan. 18, 1955 |
| 2,774,063 | Grinstead | Dec. 11, 1956 |
| 2,873,441 | Miller | Feb. 10, 1959 |